D. Swartz,
Plow.
No. 109. (A1) Patented Feb. 28. 1854.
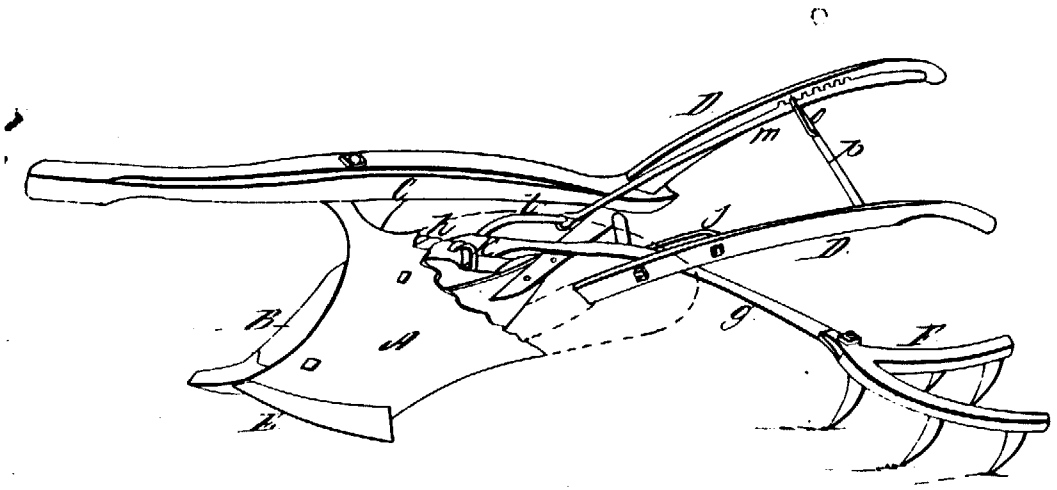

UNITED STATES PATENT OFFICE.

DAVID SWARTZ, OF TOM'S BROOK, VIRGINIA.

IMPROVEMENT IN COMBINED PLOW AND HARROW.

Specification forming part of Letters Patent No. 9,061, dated June 22, 1852; Additional Improvement No. 109, dated February 28, 1854.

*To all whom it may concern:*

Be it known that I, DAVID SWARTZ, of Tom's Brook, in the county of Shenandoah and State of Virginia, have invented a certain new and useful Improvement in my Combined Plow and Harrow, for which I obtained Letters Patent bearing date the 22d June, 1853; and I do hereby declare that the following is a full, clear, and exact description thereof, reference being had to the accompanying drawing, forming a part of this specification.

The nature of said improvement consists in the particular arrangement of the rake or harrow with the mold-board, whereby the harrow is raised or lowered conveniently by the plowman by being rotated upon its axis of connection by the aid of the hand-lever, as hereinafter more fully described, whereby less power is required than would be necessary to raise it from the ground were it otherwise attached.

Said drawing represents a perspective view of my combined plow and harrow with a portion of the mold-board broken off in order to show the handle of the rake and its connection.

A is the mold-board; B, the cutter; C, the beam; D, the handles or helves; E, the share, and F the harrow or rake.

The rake or harrow and its appendages may be made of iron. It is secured to its handle *g* by a bolt, so as to be removed at pleasure, and the whole is swiveled to the plow at the end of the handle, which passes through the bracket *h*, secured to the inside of the mold-board. The handle *g* is crooked, as represented, so that when it is turned on its fulcrum by raising or lowering the hand-lever *m* the rake is raised or lowered. The rake is sustained by the handle *g* passing through the staple *j*, sesured to the left helve, and by a nut screwed on the end of the said handle, on the outside of the bracket *h*. The handle *g* is formed stouter near the bracket *h*, at which part, on its left side, is secured the stop *k*, which is for the purpose of holding the rake in a horizontal position, when lowered, by coming in contact with the mold-board.

Opposite to the stop *k* is secured to the handle *g* a crooked lever or arm, *l*, to which is jointed the hand lever or rod *m*, by which the rake is raised or lowered. The hand-lever *m* passes up parallel with the helves through a staple, *o*, in the brace *p* of the two helves, so as to be convenient to the right hand of the plowman. This hand-lever, near its upper end, is provided with a series of notches, *q*, which enable the rake to be retained in any elevated or adjusted position by embracing the staple *o*.

I do not claim attaching the comb or rake to the beam of the plow so as it shall rise and fall vertically, as in the patent of Jacob Stroop; but What I do claim, and desire to have added to my Letters Patent of June 22, 1852, is—

Attaching the comb or rake to the rear end of the mold-board by a crooked cam lever or bar and swivel, in combination with the hand-lever, whereby it can be conveniently raised and lowered by rotating it upon its axis of connection, substantially as in the manner and for the purpose set forth.

In testimony whereof I have hereunto signed my name this 22d of December, 1853, before two subscribing witnesses.

DAVID SWARTZ.

Witnesses:
SAML. GRUBB,
I. BECKWITH WEST.